US012779408B2

(12) United States Patent
Van Santen

(10) Patent No.: US 12,779,408 B2
(45) Date of Patent: Nov. 3, 2026

(54) DEVICE FOR PREPARING A FERTILIZER SOLUTION FOR USE WITH A FERTIGATION SYSTEM

(71) Applicant: Yara International ASA, Oslo (NO)

(72) Inventor: Wouter Van Santen, Kortgene (NL)

(73) Assignee: YARA INTERNATIONAL ASA, Oslo (NO)

( * ) Notice: Subject to any disclaimer, the term of this patent is extended or adjusted under 35 U.S.C. 154(b) by 686 days.

(21) Appl. No.: 18/267,489

(22) PCT Filed: Jan. 18, 2022

(86) PCT No.: PCT/EP2022/050958
§ 371 (c)(1),
(2) Date: Jun. 15, 2023

(87) PCT Pub. No.: WO2022/152927
PCT Pub. Date: Jul. 21, 2022

(65) Prior Publication Data

US 2024/0058770 A1 Feb. 22, 2024

(30) Foreign Application Priority Data

Jan. 18, 2021 (EP) .................................... 21152099

(51) Int. Cl.
*B01F 21/00* (2022.01)
*B01F 21/20* (2022.01)
(Continued)

(52) U.S. Cl.
CPC ............ *B01F 21/22* (2022.01); *B01F 21/503* (2022.01); *B01F 23/808* (2022.01);
(Continued)

(58) Field of Classification Search
CPC .... B01F 2101/32; B01F 33/501; B01F 21/22; B01F 35/2133; B01F 35/2112;
(Continued)

(56) References Cited

U.S. PATENT DOCUMENTS

| | | | | |
|---|---|---|---|---|
| 2,122,900 A * | 7/1938 | Uhrmacher | ............. | B01F 21/15 423/208 |
| 2015/0351317 A1* | 12/2015 | Frogner | .............. | B01F 35/2202 366/182.4 |
| 2019/0134571 A1* | 5/2019 | Dubiel | ................. | A01C 23/008 |

FOREIGN PATENT DOCUMENTS

| | | |
|---|---|---|
| CN | 101576377 A | 11/2009 |
| CN | 202109953 U | 1/2012 |

(Continued)

OTHER PUBLICATIONS

Office Action and Search Report received for Chinese Application No. 202280008577.X, mailed on Jun. 17, 2025, 22 pages (9 pages of original office action and 13 pages of English Translation).

(Continued)

*Primary Examiner* — Anshu Bhatia
(74) *Attorney, Agent, or Firm* — DILWORTH IP, LLC

(57) ABSTRACT

A device for dissolving in an aqueous liquid an essentially water-soluble substance, optionally including insoluble solid matter, and, optionally for filtering the aqueous solution of the essentially water-soluble substance to remove the insoluble solid matter. The device includes a container for holding an aqueous liquid, wherein the interior of the container is divided into two separate compartments, respectively a mixing compartment and a filtering compartment, separated by a vertically positioned filter screen including a filter; a mixer positioned in the mixing compartment; an outlet in the lower half of a wall or in a base of the mixing compartment for removal of the insoluble solid matter from the mixing compartment; a grid positioned above the mixing
(Continued)

compartment includes an object for opening a bag positioned on or above the grid, and an electronic device, optionally includes a digital display, connected to a sensor.

21 Claims, 2 Drawing Sheets

(51) Int. Cl.

| | |
|---|---|
| ***B01F 23/80*** | (2022.01) |
| ***B01F 33/40*** | (2022.01) |
| ***B01F 33/501*** | (2022.01) |
| ***B01F 35/21*** | (2022.01) |
| ***B01F 35/71*** | (2022.01) |
| *B01F 101/32* | (2022.01) |

(52) U.S. Cl.
CPC .......... *B01F 33/405* (2022.01); *B01F 33/501* (2022.01); *B01F 35/2112* (2022.01); *B01F 35/2113* (2022.01); *B01F 35/2133* (2022.01); *B01F 35/7131* (2022.01); *B01F 2101/32* (2022.01)

(58) Field of Classification Search
CPC .. B01F 35/7131; B01F 21/503; B01F 23/808; B01F 35/2113; B01F 33/405
See application file for complete search history.

(56) References Cited

FOREIGN PATENT DOCUMENTS

| | | | |
|---|---|---|---|
| CN | 202453272 | U | 9/2012 |
| CN | 104296828 | A | 1/2015 |
| CN | 104881054 | A | 9/2015 |
| CN | 204912067 | U | 12/2015 |
| CN | 105258415 | A | 1/2016 |
| CN | 206535310 | U | 10/2017 |
| CN | 108975483 | A | 12/2018 |
| CN | 208406339 | U | 1/2019 |
| CN | 208490223 | | 2/2019 |
| CN | 208694808 | | 4/2019 |
| CN | 210537433 | U | 5/2020 |
| CN | 211886540 | | 11/2020 |
| EP | 3799711 | | 4/2021 |
| EP | 3799711 | A1 | 4/2021 |

OTHER PUBLICATIONS

International Search Report and Written Opinion issued in App. No. PCT/EP2022/050958, mailing date Apr. 14, 2022, 14 pages.

Extended European Search Report issued in App. No. EP21152099, dated Jul. 26, 2021, 8 pages.

* cited by examiner

DEVICE FOR PREPARING A FERTILIZER SOLUTION FOR USE WITH A FERTIGATION SYSTEM

FIELD OF THE INVENTION

This invention relates to a device for preparing a fertilizer solution for use with an irrigation system, in particular for removing insoluble solid matter from an essentially water-soluble substance after dissolution, in particular from an essentially water-soluble fertilizer with a low amount of insoluble matter, before the essentially water-soluble substance is dissolved into water and provided to an irrigation system.

BACKGROUND OF THE INVENTION

Fertigation is a technique where well-defined amounts of nutrients are dissolved in water and the fertilizer-containing water is distributed to a field of crop via the irrigation system. Such a technique allows a rapid and precise distribution of nutrients to crops that ensure an optimal growth. Fertigation reduces the total amount of water used in a farm and also reduces the use of fertilizers since these are provided in the right amount at the right time to the crops. As a consequence, loss of fertilizers in the field via leaching or gas losses (such as ammonia) are reduced and have a positive impact on the farming activities.

Although irrigation systems are very common in large and small farms, fertigation is still seen today as a complicated technique that requires complicated calculations from the farmer and advanced equipment.

Fertigation also requires the use of very pure fertilizer products with a very low amount of water-insoluble material, also called fines, to avoid clogging the irrigation equipment, such as water lines, sprinklers, and/or drippers. Such fertilizers are more expensive than fertilizers containing water-insoluble particles, which is another drawback against the use of fertigation.

EP3799711 (Yara, 2021) discloses a device for preparing a fertilizer solution, the device comprising a container divided in two compartments, a mixing means, and an outlet. The device may also comprise a grid above the container and a means to cut through a bag of fertilizer.

Therefore, there is a need for a simple system for dissolving in an aqueous liquid an essentially water-soluble substance comprising insoluble solid matter, and for filtering the aqueous solution of the water-soluble substance to remove the insoluble solid matter.

SUMMARY OF THE INVENTION

The present inventors have designed a new device comprising a container for holding an aqueous liquid, wherein the interior of the container is divided into two separate compartments, respectively a mixing compartment and a filtering compartment, separated by a vertically positioned filter screen comprising a filter, the device further comprising a mixing means positioned in the mixing compartment, an outlet in the lower half of one of the walls or in the base of the mixing compartment for removal of the insoluble solid matter from the mixing compartment, a grid positioned above the mixing compartment comprising a means for opening a bag positioned on or above the grid, and an electronic device, optionally comprising a digital display, connected to a sensor.

BRIEF DESCRIPTION OF THE FIGURES

The following description of the figure of a specific embodiment of a system according to the present disclosure is only given by way of example and is not intended to limit the present explanation, its application or use. In the figure, identical reference numerals refer to the same or similar parts and features.

DETAILED DESCRIPTION OF THE INVENTION

Figure 1:
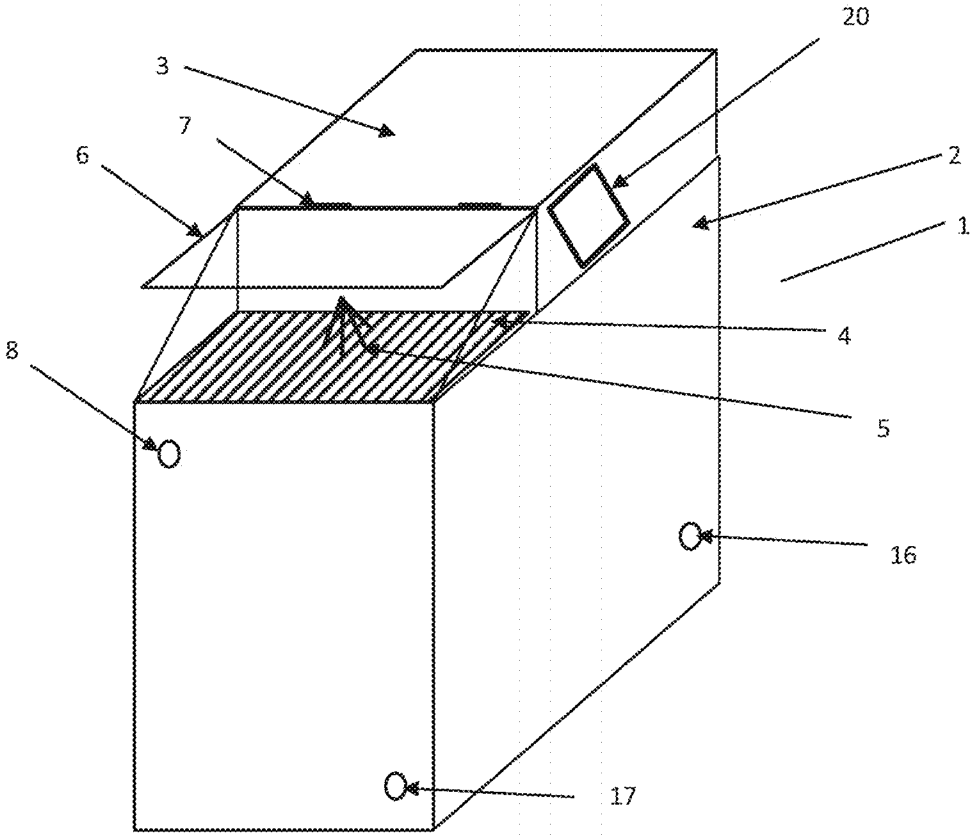
FIG. 1 represents an embodiment of the device according to the present disclosure viewed from outside.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

All references cited in this description are hereby deemed to be incorporated in their entirety by way of reference.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, in particular +/−10% or less, more in particular +/−5% or less, even more in particular +/−1% or less, and still more in particular +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "weight percent", "% wt" or "weight %", here and throughout the description unless otherwise defined, refers to the relative weight of the respective component based on the overall weight of the formulation.

In a first aspect, the present disclosure provides a new device comprising a container for holding an aqueous liquid, wherein the interior of the container is divided into two separate compartments, respectively a mixing compartment and a filtering compartment, separated by a vertically positioned filter screen comprising a filter, a mixing means positioned in the mixing compartment, an outlet in the lower half of one of the walls or in the base of the mixing compartment for removal of the insoluble solid matter from the mixing compartment, a grid positioned above the mixing compartment comprising means for opening a bag positioned on or above the grid, and an electronic device, optionally comprising a digital display, connected to a sensor.

The device comprises a container for holding an aqueous liquid. The container is divided into two separate compartments, respectively a mixing compartment and a filtering compartment, separated by a vertically positioned filter screen comprising a filter. The filter screen separates the two compartments such that an aqueous liquid in either one of the two compartments is only allowed to traverse from one compartment into the other through the filter.

The mixing compartment is configured to receive the essentially water-soluble substance, for example a solid fertilizer product, comprising insoluble solid matter, and an aqueous liquid. Upon activation of the mixing means, the dissolution of the essentially water-soluble substance in the aqueous liquid in the mixing compartment is accelerated. The mixing means also homogenizes the aqueous solution.

The filtering compartment contains, stores or holds, the filtered aqueous solution.

The aqueous liquid may be water or essentially water, i.e. water comprising other elements, compounds or impurities in small amounts, for example less than 1.0 weight %, or even less than 0.1 weight %.

The aqueous liquid may also be a mixture of water and a co-solvent, such as a polyol.

The essentially water-soluble substance may be a fertilizer product, i.e. a product comprising one or more elements required by crops. These elements are categorized in three families: the primary nutrients, nitrogen, phosphorus and potassium, the secondary nutrients, magnesium, calcium and sulphur, and the micronutrients, copper, iron, manganese, zinc, boron, molybdenum and nickel.

It is very expensive to produce fertilizer products that are suitable to be used directly in fertigation systems, since they must contain a very small amount, for example less than 0.5 weight %, of water-insoluble material, such as impurities. So, it is desirable to have a device that can use a fertilizer product containing a little more, for example between 0.6 and 1.5 weight % of water-insoluble material, because the cost will be much lower for the farmer.

The device according to the present invention may also be used with a 100% water-soluble substance. In one embodiment, the essentially water-soluble substance is a water-soluble substance comprising water-insoluble impurities, such as less than 2.0 weight %, i.e. between 0 and 2.0 weight %, or less than 1.5 weight %, i.e. between 0 and 1.5 weight %, of water-insoluble impurities.

To ensure that the fertigation or irrigation system does not get blocked by the insoluble material, the container comprises a filter screen comprising a filter. The filter will stop any particle above a predetermined size from entering the filtering compartment, and ensures that the solution present in the filtering compartment can be safely distributed in the irrigation system.

The mesh size of the filter can be adapted depending on the requirements of the irrigation system. For example, the filter may have a mesh size between 50 and 200 μm, meaning that all the particles with a size greater than the mesh size of the filter will be blocked. In one embodiment, the filter has a mesh size of 50, 60, 70, 80, 90, 100, 150, 200 μm. In one embodiment, the filter is stainless steel mesh sheet. In one embodiment, the filter screen comprises a filter encased between two rigid plates. The filter may be quite thin with a low rigidity. To keep it in place in the filter screen, it may be preferable to encase the filter between two rigid plates. The rigid plates may be made of plastic, such as polyethylene, or stainless steel. The rigid plates comprise large holes, for example with a diameter between 1 to 20 cm, 5 to 20 cm, 5 to 15 cm, or 1 to 15 cm, to allow the solution to go through the filter.

In one embodiment, the filter screen may comprise more than one filter encased between two rigid plates. The filters may have the same or different mesh size. For example, the filter screen may comprise a filter with a mesh size of 200 μm and a filter with a mesh size of 50 μm. The two filters may be of the same size and superposed on each other, the filter with the larger mesh facing the mixing compartment and the filter with the smaller mesh size facing the filtering compartment. In that configuration, the first filter blocks any insoluble particle with a size over 200 μm, and the second filter blocks insoluble particles with a size between 50 and 200 μm. Such a setup will prolong the life of the second filter while obtaining an aqueous solution with a very low amount of insoluble particles.

In one embodiment, the filter reaches the bottom of the container or below 5% of the height of the container. A filter reaching to the bottom or almost the bottom of the container would ensure that the level of the aqueous solution in both mixing and filtering compartments is the same at any time. If the filter does not reach low enough, a portion of the solution prepared in the mixing compartment will stay stagnant in the mixing compartment and not be able to reach the filtering compartment. This will lead to a waste of water-soluble substance that can never be used.

In one embodiment, the container is made of plastic, such as polyethylene, preferably a non-translucent polyethylene. Polyethylene is a cheap and inert material, in particular for an aqueous solution, that can easily be welded or joined together and has a good mechanical strength to hold the aqueous composition inside and resist the shear forces during mixing. In one embodiment, the container is non-translucent to prevent degradation of the aqueous solution under influence of sunlight when the device is used to store aqueous composition.

The device further comprises a mixing means positioned in the mixing compartment. The mixing means allows the user to mix the essentially water-soluble product and the aqueous liquid, so that the water-soluble product dissolves in the aqueous liquid.

In one embodiment, the mixing means is a mechanical mixing means powered by a motor, such as an electric motor.

In one embodiment, the mixing means comprises an air pipe comprising an inlet and an outlet, wherein the inlet of the air pipe is configured to receive air, in particular compressed air, and the outlet of the pipe is located in the mixing compartment. The device may comprise a means for feeding air into the inlet of the air pipe. Such means for feeding air may be electrically-powered, such as an air blower, or an air compressor, or manually powered, such as a bellows or a recipient containing compressed air. The means for feeding air to the air pipe may be comprised in the device, i.e. permanently attached or linked to the device. Alternatively, the means for feeding air into the inlet may be an independent device.

It was found that it was possible to mix the mixture of water-soluble product and aqueous liquid by blowing air into the mixing container. Such a mixing means provides an advantage in that the water-soluble product and the water can be added in any particular order into the mixing tank. With a mechanical mixing means, it was observed that it was required to add an amount of water, for example to 25% of the volume of the container, before adding any product to dissolve. Otherwise, the product would start caking and block the mixing means.

Furthermore, it was observed that the air pipe had a beneficial effect on the filter in that the filter required less maintenance, i.e. less cleaning, than with a mechanical mixing means. Without being bound by theory, it is thought that air bubbles blown into the mixing container, and/or the turbulence created by these air bubbles, dislodge the water-insoluble particles from the filter and keeps them in circulation while the means for feeding air to the air pipe is active. This effect leads to a greater fraction of the water-insoluble material to fall at the bottom of the mixing container and not stay in the filter. The filter then requires to be cleaned less often which reduces the workload for the user of the device. It is also envisioned that a mixing means comprising an air pipe reduces the risk of damage to the device if unexpected items fall in the mixing compartment. When the device comprises a mechanical mixing means, such as a rotating blade, there is a risk that the mixing means and/or the device ay be damaged by the introduction of foreign objects, such as a fertilizer bag. The grid normally prevents such objects from falling into the mixing compartment, but over the lifetime of the device, the grid may be damaged, or the user may decide to remove the grid.

In one embodiment, the outlet of the air pipe reaches below 20% of the height of the mixing compartment. The dissolution of the product in the aqueous liquid was obtained more rapidly when the air was blown near the bottom of the mixing container ensuring efficient mixing in the whole compartment. Blowing air above 20% of the height of the mixing compartment eventually dissolved the product but in a longer time period.

In one embodiment, the air pipe comprises two or more outlets located in the mixing compartment, in particular three outlets. The air pipe may comprise a junction portion to connect the air inlet with the two or more outlets. The junction may be triangular-shaped where the air pipe comprises two outlets or cross-shaped where the air pipe comprises three outlets. Where the mixing means comprises more than one outlet, the mixing is more turbulent, and the dissolution of the product is achieved in a shorter period of time. A more turbulent mixing also reduces the risk of having stagnant solid material in the mixing container, for example in the corners.

Very good results were achieved where the air pipe comprises three outlets laying on the bottom of the mixing container, wherein the air pipe comprised a cross-shaped junction linking the air inlet and the three air outlets. The four branches, one inlet and three outlets, are in the same plane, and placed at 90° of the adjacent branches. Such an air pipe can be easily built with standard plumbing equipment, such as plastic pipes and junctions.

In one embodiment, the device comprises means for pre-heating the air being fed to the air pipe. In one embodiment, the air blown into the air pipe is pre-heated, in particular above the ambient temperature. This may be achieved by using an air blower comprising a heating means to heat up the air that it blows, or a separate air heater unit may be used to pre-heat the stream of air before feeding it to the means for feeding air to the air pipe. Pre-heating the air before feeding it into the mixing compartment will heat the aqueous solution in the mixing compartment. This can be an advantage where the ambient temperature, and thus the temperature of the aqueous solution in the mixing compartment, is low, for example below 20° C., 15° C. or 10° C. Heating up the water in the mixing compartment will accelerate the dissolution of the water-soluble substance in the aqueous solution. The pre-heated air can also be used for heating up the whole device, for example if ice has formed into the mixing or filtering compartment.

The device further comprises a grid positioned above the mixing compartment comprising a means for opening a bag, in particular a fertilizer bag, positioned on or above the grid.

The product to be dissolved in the device is often packaged in bags of 1 to 25 kg, in particular plastic bags, and the user has to lift the bag above the opening of the mixing compartment, open the bag, for example with a sharp object, while maintaining the bag above the opening and pouring the content of the bag into the mixing compartment while spilling as little content as possible. If the bag is small enough to be carried with one hand, the operation can be done in a safe and efficient manner, but this is very difficult for large bags, in particular if the user is not very strong or suffers from a disability. So, a grid is placed above the mixing compartment, so that the user can place the bag of product onto this grid.

The grid provides a location where the bag can be placed safely without tilting the device.

This may still be a challenge for large bags, but it greatly simplifies the other steps, opening the bag and emptying its content, as the user can now use both hands to carry out these steps.

Furthermore, a means for opening a bag is positioned on or above the grid, so that the bag may be opened as the user places the bag on the grid. The means for opening may be an object with a sharp portion that opens the bag by piercing, puncturing, or cutting an opening, such as a hole, into the bag packaging when the bag is placed next to the means or on top of the means. The bag may be placed directly next to or over the means for opening by the user. Alternatively, the means for opening may be installed so that the user may place the bag on the grid, and then simply push or tip over the bag onto the means for opening.

The means for opening a bag may be stationary, i.e. permanently attached to the grid. It may be preferable that the means for opening a bag do not require the user to handle the means for opening, but that the bag is opened simply by placing the bag into contact with the means for opening.

The means for opening may be designed to open the bag on any location of the bag, in particular the bottom of the bag.

In one embodiment, the means for opening a bag is made, at least partially, of metal, such as steel or stainless steel. Metal items can be sharpened to efficiently open the bag by piercing, or puncturing its packaging.

In one embodiment, the means for opening a bag is made of plastics, such as high-density polyethylene (HDPE), or high-density polypropylene (HDPP). It is possible to make very durable objects out of plastics such as HDPE and HDPP, and sharp enough so that they can open a bag, in particular a fertilizer bag.

In one embodiment, the means for opening a bag has a triangular shape. In one embodiment, the means for opening a bag has a triangular shape and is positioned on the grid.

In one embodiment, the means for opening a bag has a trapezoidal shape, i.e. a quadrilateral where two opposing sides are parallel. In one embodiment, the means for opening a bag has the shape of an isosceles trapezoid.

In one embodiment, the means for opening a bag comprises an element or a part with a triangle wave shape or sawtooth wave shape.

In one embodiment, the means for opening a bag has a height of from 10 to 50 cm, from 10 to 40 cm, from 10 to 30 cm, from 15 to 50 cm, from 15 to 40 cm, or from 15 to 30 cm. In one embodiment, the means for opening a bag has a length of from 20 to 60 cm, from 30 to 60 cm, from 20 to 50 cm, from 25 to 50 cm, from 30 to 55 cm, or from 30 to 50 cm.

A means for opening that opens the bag when the bag is placed over the means is particularly attractive as the content of the bag is released as soon as the bag is pierced or punctured by the means. This does not require the user to further manipulate the bag, for example tilting it over the grid.

The grid should be strong enough to support the bags that the user is supposed to use, so that a bag, such as a 1 kg, 10 kg or up to 25 kg bag, can be placed on the grid without causing any deformation or damage to the grid. In one embodiment, the grid is made of stainless steel, which is a strong material and will not rust in a humid aqueous environment. Alternatively, the grid can be made of a plastic, such as polyethylene. Plastic is also non-reactive in humid environment and can be made strong enough by using the correct dimensions, such as thickness, to resist heavy charges, such as a 25 kg bag.

In one embodiment, the grid is adapted to support a big bag. Big bags are very large bags, often made of plastic, that can contain from 100 kg up to 1500 kg of a material, such as fertilizer. Big bags are used in very large farms. Their advantage is a lower cost per weight of fertilizer compared to smaller bags. The grid has a determined mesh size, which may be rather large, for example 1 to 5 centimeters. The grid prevents any large item, such as a bag, to enter the mixing compartment, but it does not require a small mesh size to filter water-insoluble particle. This task is accomplished by the filter in the container.

The device according to the present disclosure allows the user to perform several operations in a single device: it is a container for a fertilizer product where it can be immediately dissolved in an aqueous liquid and fed into the irrigation system. The user does not require further equipment such as a scale to measure a specific amount of fertilizer, and/or separate mixing means to dissolve the substance in the aqueous liquid. Such a device reduces potential mistakes from farmer, reduces waste produced by the farm and is more economical.

In one embodiment, the device comprises a means for lifting a big bag above the mixing compartment. As mentioned above, big bags contain a lot of material and cannot be lifted by hand.

So, the device can comprise a means for lifting such a bag above the mixing compartment, such as a small crane. The means for lifting the bag may be operated electrically or manually, for example with a pulley system to help the user.

In one embodiment, the device comprises a means for dosing the filtered aqueous solution of the water-soluble substance to an external water line. The device may comprise an element such that the filtered aqueous solution of the device can be mixed with or injected in an external water line. The resulting mixture can then be distributed to crops. The means for dosing may be a Venturi-based system or a Dosatron©. Dosatron© chemical injectors are water-powered, non-electric chemical injectors to accurately inject chemicals into water lines. Dosatron© injectors work using volumetric proportioning, ensuring that the chemical mixture remains the same regardless of variations in pressure and flow.

In one embodiment, the device comprises an electronic device, optionally comprising a digital display, connected to a sensor. Electronic devices can be used for various purposes in the device according to the present invention. An electronic device comprising a digital display may be a useful addition to the device as it allows to communicate quickly and easily with the user. Different kinds of information can be displayed on the display and communicated to the user. The sensor connected to the electronic device can measured different parameters relevant to the farmers. The sensor and the electronic device can provide precise data to the user which improves the performance of the device. The electronic device may be placed on a wall of the container or above the mixing or the filtering compartment.

The electronic device may comprise a processing unit and/or a memory unit. The electronic device is capable of processing a signal from different sensors, and optionally, displaying the signal from the sensor on its digital display.

In one embodiment, the sensor is capable of detecting the level of the aqueous solution in the mixing compartment. It is useful for a user to know the level of liquid left in the container. The walls of the container and/or the device may be opaque and prevent the user for checking visually the level of liquid left in the container. The device may also be closed off by a lid, which may prevent the user from determining visually the level of aqueous solution left in the container. It is an advantage to know the exact level in the container as it allows the user to correctly plan his activities, for example, when more water-soluble product needs to be ordered.

In one embodiment, the electronic device comprises a communication module capable of communicating wirelessly with remote third-parties over a network, such as a Wi-Fi network, a mobile network or a combination thereof. Examples of mobile networks that the communication module may be configured to use comprise 2G networks, such as GSM, 3G networks, 4G networks, such as LTE, LTE Advanced, LTE Advanced Pro, WiMAX or WiMAX-Advanced, and/or 5G networks. In one embodiment, the electronic device may be configured to send an order for a water-soluble product once the level in the container reaches a predetermined level. This ensures that the user always has enough water-soluble product and solution to work with.

In one embodiment, the sensor detecting the level of the aqueous solution in the mixing compartment is a pressure sensor. These sensors are well known in the field, and provide a reliable evaluation of the remaining liquid in the container. Alternatively, the sensor detecting the level of the aqueous solution is a radar-based sensor.

In one embodiment, the device comprises a sensor for measuring the electrical conductivity of the aqueous solution in the container. The sensor may be located in the mixing or filtering compartment, or located downstream of the outlet of the device. The electrical conductivity of an aqueous fertilizer solution is correlated to the ion content of the fertilizer solution. The sensor may measure the electrical conductivity of the solution as prepared in the device, or it may measure the electrical conductivity of a mixture comprising the solution prepared in the device and mixed with an external water line. The electrical conductivity of a fertilizer solution can be used by the farmer to know whether he added enough fertilizer product to the device. The sensor for measuring the electrical conductivity may be connected to the electronic device.

In one embodiment, the device comprises an inlet valve in the mixing compartment, in particular an electronically-controlled inlet valve, i.e. a valve that can be opened and closed by an electronic controller. The electronically-controlled inlet valve may be connected to the electronic device and controlled by the electronic device. The inlet valve may be connected to a water source and allows an automatic filling of the container. It can be envisioned that the user may give a command to the electronic device, either via wireless connection or via a digital display, to fill up the container up to a predetermined level. The electronic device that contains a sensor for detecting the level of the aqueous solution in the container can then open the valve to begin filling up the mixing compartment and close the valve when the sensor indicates that the desired level in the mixing compartment has been reached. An electronically-controlled inlet valve reduces the workload for the user as he does not have to stay by the container while it is filling up and ensures a correct concentration of the final aqueous solution, thereby increasing the reliability of the device for the user.

In one embodiment, the device comprises an outlet valve comprised in the filtering compartment. The valve may be electronically-controlled, in particular by the electronic device. The outlet valve may allow an automatic removal of the filtered aqueous solution to the fertigation system.

The valve may be located at the bottom of the filtering compartment, or connected to a water pipe or tube reaching the bottom of the filtering compartment. The valve may be controlled by the electronic device to turn on and off the dispensing of the aqueous solution. In particular, the outlet valve should be closed when the inlet valve is open.

In one embodiment, the device comprises an inlet valve in the mixing compartment as described above, in particular an electronically-controlled inlet valve, and an outlet valve comprised in the filtering compartment, as described above, in particular an electronically-controlled outlet valve. In one embodiment, the volume ratio of the filtering compartment to the mixing compartment ranges from 1:1 to 1:5, in particular 1:3. It may be preferable that the filtering compartment is at least as large as the mixing compartment to allow an easier removal or transfer of the mixed and filtered solution to the irrigation system.

In one embodiment, the mixing compartment comprises a water inlet. A water inlet with a standard connection for water hose or water line simplifies the filling of the container with water. The water line or hose can be securely attached to the device while water is added to the container.

The water inlet may also be located above the mixing or the filtering compartment where the device comprises a lid covering at least partially the filtering compartment. If the mixing and filtering compartments are connected by a water-permeable filter reaching the bottom of the container, the water level is identical at any time in both the mixing compartment and the filtering compartment. So water can be added to the mixing compartment or the filtering compartment In one embodiment, the filtering compartment is closed off by a lid. The user does not need to add anything to the filtering compartment, so the filtering compartment may be closed off by a lid to prevent any object to enter the compartment and pollute the filtered solution. In one embodiment, the lid of the filtering compartment comprises an opening for water uptake. The opening may be a hole where a water hose can be introduced. The opening may also be an adaptor connected to a hose plunging into the filtering compartment, where the user can connect its irrigation system to the adaptor and pump out the solution in the filtering compartment.

In one embodiment, the device comprises a removable lid for covering the grid positioned above the mixing compartment. It may be an advantage to be able to cover the grid when no product is added into the mixing compartment. This ensures that no unwanted object falls into the mixing compartment and pollutes the solution in the container. But since the grid needs to be accessible when adding product to the mixing container, a removable lid is preferred. The removable lid may be attached to the device, for example via hinges, that allow the opening and closure of the lid as required. In one embodiment, the filter in the filter screen covers more than about 50%, in particular more than about 70%, at most about 95% of the filter screen surface. The maintenance requirement of a filter may depend on its size, as a smaller filter would get blocked more rapidly than a larger filter since it has less surface to accumulate the water-insoluble impurities.

In one embodiment, the filter has a mesh size ranging between 50 and 200 micrometres. It was observed that a filter with a mesh size of 50 to 200 micrometres gave a filtered solution that did not block most irrigation lines. Depending on the exact setup of the irrigation of the user, the mesh size of the filter can be chosen accordingly.

In one embodiment, the container has a rectangular cuboid shape, defined by four upright rectangular side walls and a rectangular bottom wall. Alternatively, the container has a cylindrical shape, such shapes are commonly available, especially for large volumes over 1000 liters.

In one embodiment, the volume of the container is 1000 to 5000 litres. For example, the container may be a standard intermediate bulk container (IBC) in plastic or metal. It is envisioned that the present disclosure would be particularly interesting for farms cultivating an area of 1 ha to 50 ha that already possess an irrigation system, but do not use such system to provide fertilizer to the crops. A container with a volume of 1000 to 5000 litres would require from 1 kg to 50 kg each time the container is empty which is manageable for a small farm employing only one or two persons.

In one embodiment, the volume of the container is above 5000 litres, such as 10 000 or 15 000 litres. Large farms may use larger containers to reduces the time interval between two refills of the container. Such farms may use fertilizer in big bags.

In one embodiment, the device according to the present disclosure comprises an electric battery. It may be an advantage for the device to comprise its own power sources, so that it can be used in locations without access to a power outlet. The battery can power any elements of the device that require electricity, such as an air blower, a sensor, a water pump, or an electronic device comprising a digital display.

In one embodiment, the device comprises solar panels. Solar panels can be attached to the device, such as on the walls or the lid of the device, and can be used to power elements of the device requiring electricity to work.

In one embodiment, the device comprises a battery and solar panels connected to the battery. Instead of powering directly elements of the device, the solar panels can be used to charge a battery.

In another aspect, the present disclosure provides a method for dissolving in an aqueous liquid a water-soluble substance, optionally comprising insoluble solid matter, and optionally for filtering the aqueous solution of the water-soluble substance to remove the insoluble solid matter, comprising: (i) providing a device according to the present disclosure; (ii) opening a bag comprising a water-soluble substance, optionally comprising insoluble solid matter, with the means for opening a bag, thereby providing the water-soluble substance into the mixing compartment; (iii) providing an amount of an aqueous liquid into the mixing compartment; (iv) activating the mixing means until the essentially water-soluble substance is dissolved.

In one embodiment, the aqueous liquid provided to the mixing compartment is water. Standard tap water may be used if the tap water fulfills the purity requirement for use in irrigation. Alternatively, rain water or well water may be used. If the water source is not suitable for use in agriculture, the water may be treated according to standard procedures to obtain suitable water for irrigation.

The addition of the water-soluble substance and the water into the mixing compartment can be done in any particular order: the substance may be added fully before any water is added to the compartment; the container may be filled to the desired level with water before any substance is added; or the addition of water and water-soluble substance can be done simultaneously.

Once the water-soluble substance is dissolved in the aqueous liquid, the device may be connected to the irrigation system of the user to distribute the solution to the fields.

In another aspect, the present disclosure provides the use of a device according to the present disclosure for removing insoluble solid matter from an essentially soluble fertilizer by dissolution of the essentially soluble fertilizer in an aqueous liquid and for the separation of the insoluble solid matter through filtration.

FIG. 1 represents an embodiment of the device according to the present invention. The device 1 comprises a container with four rectangular walls 2. The container is partially closed by a lid 3 which covers the filtering compartment 14 and part of the mixing compartment 12. The other part of the mixing compartment not covered by the lid 3 is covered by a grid 4. On the grid 4 sits a means for opening a bag 5. The means for opening a bag 5 is made of metal, in particular stainless steel, and comprises four legs joined together at the top of the means 5. The top of the means 5 is sharp enough so that it can cut open a plastic bag containing a water-soluble substance when the bag is placed on top of the means 5. When the means 5 cut the bag open, the water-soluble substance starts to fall into the mixing compartment 12 via the grid 4. The device comprises a movable lid 6 attached to the lid 3 via hinges 7. When the user wants to add water or a substance to the mixing compartment 12, the removable lid 6 can be wide opened to facilitate such addition, and after the addition the lid 6 is closed to cover the grid 4. The device 1 may also comprise a water inlet 8 to provide water to the container. Alternatively, the water inlet 8 may be located on the lid 3, and may be above the mixing compartment or the filtering compartment. The device may comprise a water outlet 16 located on one of the wall of the container and connected to the filtering compartment of the device, so that the solution comprising the dissolved substance may be tapped out of the device 1. Alternatively, the water outlet 16 may be located on the lid 3 above the filtering compartment 14. Alternatively, the lid 3 may be removable and a water hose or pipe may be introduced from the top of the device. The device 1 comprises an outlet 17 in the lower half of the front wall of the mixing compartment 12 for removal of the insoluble solid matter from the mixing compartment 12.

Figure 2:
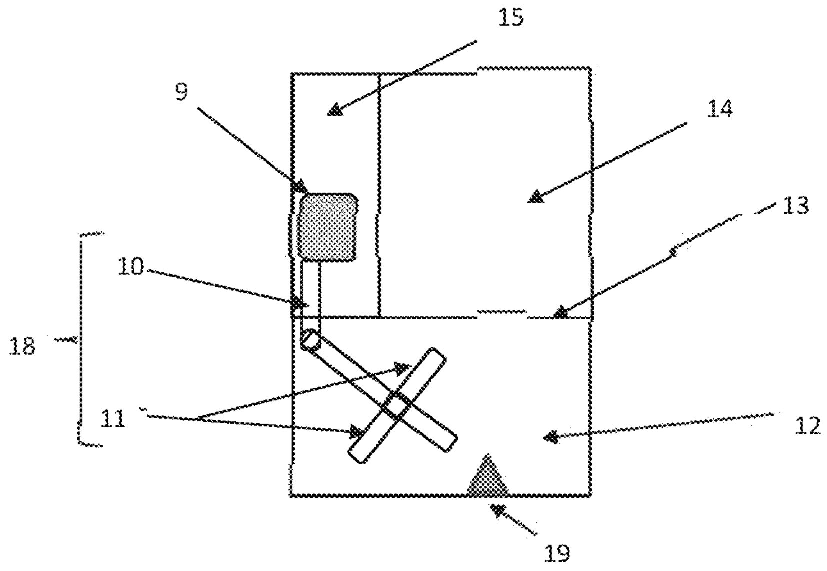
FIG. 2 is the same embodiment as shown in FIG. 1, but viewed from above where the lid and grid have been removed.

FIG. 2 represents a view from above the device represented in FIG. 1 where the lid 3 and grid 4 have been omitted for clarity purposes. The device 1 comprises an air blower 9 for blowing air into the mixing compartment 12 and mix the substance with the aqueous liquid. The air blower 9 may be operated by a battery or connected via an electrical connection to the electricity grid. The air blower is resting on a small platform 15 located at about the same height as the grid 4. The outlet of the air blower 9 is connected to the inlet 10 of an air pipe 18 which is continued into the mixing compartment 12. The air pipe 18 comprises three outlets 11 lying at the bottom of the mixing compartment 12. A filter screen 13 comprising a filter with a mesh size of 50 μm (not shown) is separating the mixing compartment 12 with the filtering compartment 14. The device 1 further comprises an electronic device 20 comprising a digital display, the device 20 is embedded in one of the wall of the device 1, such that the user can see its digital display. The device 20 is connected to a sensor 19 in the mixing compartment 12, for instance to detect the level of the aqueous solution in the mixing compartment 12.

The invention claimed is:

1. A device for dissolving in an aqueous liquid an essentially water-soluble substance, thereby obtaining an aqueous solution and filtering said aqueous solution to remove, if present, insoluble solid matter, comprising:

(i) a container for holding the aqueous liquid, wherein an interior of the container is divided into two separate compartments, respectively a mixing compartment and a filtering compartment, separated by a vertically positioned filter screen comprising a filter;

(ii) a mixer positioned in the mixing compartment;

(iii) an outlet in a lower half of one a wall or in a base of the mixing compartment for removal of the insoluble solid matter from the mixing compartment; and (iv) a grid positioned above the mixing compartment comprising an object for opening a bag positioned on or above the grid, and (v) an electronic device connected to a sensor.

2. The device according to claim 1, wherein a volume ratio of the filtering compartment to the mixing compartment ranges from 1:1 to 1:5.

3. The device according to claim 1, wherein the mixing compartment comprises a water inlet.

4. The device according to claim 1, wherein the filtering compartment is closed off by a lid.

5. The device according to claim 4, wherein the lid comprises an opening for water uptake.

6. The device according to claim 1, comprising a removable lid for covering the grid positioned above the mixing compartment.

7. The device according to claim 1, wherein the filter in the filter screen comprises more than about 50% of a surface of the filter screen.

8. The device according to claim 7, wherein the filter in the filter screen comprises more than about 70% of the surface of the filter screen.

9. The device according to claim 1, wherein the filter has a mesh size between 50 and 200 micrometres.

10. The device according to claim 1, wherein the sensor is capable of detecting a level of the aqueous solution in the mixing compartment.

11. The device according to claim 10, wherein the sensor is a pressure sensor or a height sensor.

12. The device according to claim 1, wherein the sensor is configured to measure an electrical conductivity of the aqueous solution.

13. The device according to claim 1, wherein the device comprises wheels.

14. A method for dissolving in an aqueous liquid a water-soluble substance, thereby obtaining an aqueous solution, and filtering said aqueous solution to remove, if present, insoluble solid matter, comprising:

(i) providing the device as claimed in claim 1;

(ii) opening the bag comprising the water-soluble substance with the object for opening a bag, thereby providing the water-soluble substance into the mixing compartment;

(iii) providing an amount of the aqueous liquid into the mixing compartment; and (iv) activating the mixer until the essentially water-soluble substance is dissolved.

15. The method according to claim 14, wherein the water-soluble substance comprises insoluble solid matter.

16. The device according to claim 1, wherein the electronic device comprises a digital display.

17. The device according to claim 1, wherein the filter is configured to retain insoluble solid material in the mixing compartment while allowing liquid to pass through to the filtering compartment.

18. A device for dissolving in an aqueous liquid an essentially water-soluble substance, thereby obtaining an aqueous solution and filtering said aqueous solution to remove, if present, insoluble solid matter, comprising:

(i) a container for holding the aqueous liquid, wherein an interior of the container is divided into two separate compartments, respectively a mixing compartment and a filtering compartment, separated by a vertically positioned filter screen comprising a filter;

(ii) a mixer positioned in the mixing compartment;

(iii) an outlet in a lower half of one a wall or in a base of the mixing compartment for removal of the insoluble solid matter from the mixing compartment; and (iv) a grid positioned above the mixing compartment comprising an object for opening a bag positioned on or above the grid, and (v) an electronic device connected to a sensor, wherein the mixer comprises an air pipe comprising an inlet and an outlet, wherein the inlet of the air pipe is configured to receive air from a device for feeding air into the inlet and the outlet of the pipe is located in the mixing compartment.

19. The device according to claim 18, wherein the outlet of the air pipe reaches below 20% of a height of the mixing compartment.

20. The device according to claim 18, wherein the air pipe comprises two or more outlets.

21. The device according to claim 20, wherein the air pipe comprises three outlets.

* * * * *